(12) United States Patent
Thielert et al.

(10) Patent No.: US 10,300,446 B2
(45) Date of Patent: May 28, 2019

(54) CATALYTIC REACTOR (71) Applicants: THYSSENKRUPP INDUSTRIAL SOLUTIONS AG, Essen (DE); thyssenkrupp AG, Essen (DE)

(72) Inventors: Holger Thielert, Dortmund (DE); Zion Guetta, Dortmund (DE)

(73) Assignees: THYSSENKRUPP INDUSTRIAL SOLUTIONS AG, Essen (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 15/754,448

(22) PCT Filed: Sep. 1, 2016

(86) PCT No.: PCT/EP2016/070630
§ 371 (c)(1),
(2) Date: Feb. 22, 2018

(87) PCT Pub. No.: WO2017/037183
PCT Pub. Date: Mar. 9, 2017

(65) Prior Publication Data
US 2018/0243714 A1  Aug. 30, 2018

(30) Foreign Application Priority Data
Sep. 4, 2015  (DE) .................. 10 2015 114 885

(51) Int. Cl.
*B01J 8/04* (2006.01)
*C01B 17/80* (2006.01)
*C01B 17/765* (2006.01)

(52) U.S. Cl.
CPC ............. *B01J 8/0453* (2013.01); *B01J 8/048* (2013.01); *B01J 8/0492* (2013.01);
(Continued)

(58) Field of Classification Search
CPC ........ B01J 8/0453; B01J 8/0492; B01J 8/048; B01J 2208/00938; B01J 2208/00893;
(Continued)

(56) References Cited

U.S. PATENT DOCUMENTS

| 1,857,308 A | 5/1932 | Isenberg |
| 2,198,795 A * | 4/1940 | Titlestad ............... C01B 17/803 422/161 |

(Continued)

FOREIGN PATENT DOCUMENTS

| DE | 2014920 A | 10/1971 |
| DE | 2157198 B | 7/1972 |

(Continued)

OTHER PUBLICATIONS

English Translation of International Search Report issued in PCT/EP2016/070630, dated Nov. 4, 2016 (dated Nov. 18, 2016).

*Primary Examiner* — Lessanework Seifu
(74) *Attorney, Agent, or Firm* — thyssenkrupp North America, Inc.

(57) ABSTRACT

A catalytic reactor may have at least one reactor module and a shell that extends about a reactor center axis. The reactor module may include a gas distribution chamber, a gas collection chamber, and a catalyst. The gas distribution chamber may be connected to a shell-side gas feed. The gas collection chamber may be connected to a shell-side gas discharge. A catalyst bed between the distribution and collection chambers may extend transversely to the reactor center axis. The gas distribution and collection chambers are bounded by the catalyst bed and reactor walls. The gas feed either opens into the gas distribution chamber on the shell side or is connected to a pipe length that extends towards the reactor center axis and opens into the gas distribution chamber in the region of the reactor center axis. A height parallel to the reactor center axis of the gas distribution (Continued)

chamber reduces towards the reactor center axis starting from a mouth of the gas feed in the case of a shell-side connection.

6 Claims, 5 Drawing Sheets

(52) U.S. Cl.
CPC .......... *C01B 17/765* (2013.01); *C01B 17/803* (2013.01); *B01J 2208/00274* (2013.01); *B01J 2208/00548* (2013.01); *B01J 2208/00938* (2013.01)

(58) Field of Classification Search
CPC ............ B01J 2208/00548; C01B 17/80; C01B 17/803; C01B 17/765
See application file for complete search history.

(56) References Cited

U.S. PATENT DOCUMENTS

| | | | |
|---|---|---|---|
| 2,892,262 A * | 6/1959 | Shirk | B01J 8/0278 34/585 |
| 5,232,670 A | 8/1993 | Cameron | |
| 2003/0175183 A1 | 9/2003 | Guetlhuber | |

FOREIGN PATENT DOCUMENTS

| | | | |
|---|---|---|---|
| DE | 2337958 | A | 2/1975 |
| EP | 0279060 | A | 8/1988 |
| GB | 2236691 | A | 4/1991 |
| JP | S5223572 | A | 2/1977 |
| WO | 8603187 | A | 6/1986 |

* cited by examiner

CATALYTIC REACTOR

CROSS REFERENCE TO RELATED APPLICATIONS

This application is a U.S. National Stage Entry of International Patent Application Serial Number PCT/EP2016/070630, filed Sep. 1, 2016, which claims priority to German Patent Application No. DE 10 2015 114 885.4, filed Sep. 4, 2015, the entire contents of both of which are incorporated herein by reference.

FIELD

The present disclosure generally relates to catalytic reactors and the production of sulfuric acid, including multistage contact towers for converting sulfur dioxide ($SO_2$) into sulfur trioxide ($SO_3$).

BACKGROUND

The catalytic reactor conventionally comprises a plurality of reactor modules which are arranged one above the other and in which the reactor bed is arranged horizontally, wherein flow then proceeds through the reactor beds in a vertical direction, in each case starting from the associated gas distribution chamber towards the associated gas collection chamber.

Between the individual reactor modules, the process gas is discharged from the catalytic reactor in order to permit temperature regulation and/or further chemical conversion processes.

Multistage catalytic reactors for converting $SO_2$ into $SO_3$ in the production of sulfuric acid are also known in the industry as contactors.

It is precisely in the large-scale industrial production of sulfuric acid and fuming sulfuric acid that stringent requirements arise purely due to the conventional volumes involved in the oxidation of sulfur dioxide to sulfur trioxide. Accordingly, catalytic reactors for producing 2000 tonnes of sulfuric acid per day are for example known in practice which have a height of approx. 23 m, a diameter of approx. 11.5 m and a weight of approx. 330 tonnes. The material used here is high temperature-resistant special steel.

Unwanted emissions of sulfur dioxide from the sulfuric acid production plant are essentially determined by the extent to which the catalytic conversion of sulfur dioxide to sulfur trioxide proceeds to completion in the multistage contact tower. According to the German Guideline, Technical Directions for Air from 2002, catalytic conversion must be greater than 99.8% and, according to stricter guidelines, even greater than 99.9%. Maximally complete catalytic conversion is thus not only desirable on economic grounds but also frequently necessary in order to comply with environmental requirements. It must also be borne in mind that the degree of catalytic conversion may also vary as a function of the capacity utilization of the catalytic reactor.

Due to the typical size of the catalytic reactor, the simplest possible design should also be used which permits straightforward assembly on site and minimizes material consumption.

A catalytic reactor, specifically a multistage contact tower for converting sulfur dioxide into sulfur trioxide in the production of sulfuric acid according to the preamble of claim 1 is known from WO 86/03187 A1. In particular when such a plant is operated under part load, the efficiency of catalytic conversion is frequently not sufficient to meet stringent legislative requirements.

According to a fundamentally different approach to design, multistage contact towers are known in which gas distribution proceeds through a central pipe. Such a contact tower exchanger is known from DE 23 37 958 A1. The design does, however, suffer the disadvantage of being relatively complex and thus costly to produce and assemble.

Thus a need exists for a catalytic reactor, in particular a multistage contact tower for converting $SO_2$ into $SO_3$ in the production of sulfuric acid which is distinguished by both particularly efficient catalytic conversion and a simple design.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to catalytic reactors, including, for example, a multistage contact tower for converting sulfur dioxide ($SO_2$) into sulfur trioxide ($SO_3$) in the production of sulfuric acid having a shell that extends about a reactor center axis and having at least one reactor module that comprises a gas distribution chamber connected to a shell-side gas feed, a gas collection chamber connected to a shell-side gas discharge, and, between the gas distribution chamber and the gas collection chamber, a catalyst bed that extends transversely of the reactor center axis. The gas distribution chamber and the gas collection chamber may each be bounded by the catalyst bed and an associated reactor wall.

On the basis of a catalytic reactor, in particular a multistage contact tower for converting $SO_2$ into $SO_3$ in the production of sulfuric acid, the invention accordingly provides that the gas feed either opens into the gas distribution chamber on the shell side or is connected to a pipe length which extends towards the reactor center axis and opens into the gas distribution chamber in the region of the reactor center axis, wherein a height, determined parallel to the reactor center axis, of the gas distribution chamber reduces towards the reactor longitudinal axis starting from a mouth of the gas feed in the case of a shell-side connection, or reduces, preferably continuously, towards the shell starting from the pipe length which opens into the region of the reactor center axis, and that the gas discharge either opens into the gas collection chamber on the shell side or is connected to a pipe length which extends towards the reactor center axis and opens into the gas collection chamber in the region of the reactor center axis, wherein a height, determined parallel to the reactor longitudinal axis, of the gas collection chamber reduces towards the reactor longitudinal axis starting from a mouth of the gas discharge in the case of a shell-side connection or reduces, preferably continuously, towards the shell starting from the pipe length which opens into the region of the reactor center axis.

The present invention is based in this connection on the recognition that, starting from the mouth of the gas feed or the pipe length which opens into the region of the reactor center axis, flow of the process gas continuously reduces respectively inwards or outwards in the radial direction due to some of the process gas entering the catalyst bed. Thus, the greater is the distance from the corresponding mouth, the smaller are thus the flow volumes, for which reason against this background more uniform flow and distribution can be achieved by a corresponding reduction in the height of the gas collection chamber. In particular, the available volumes are also better utilized in order to provide the largest possible flow cross-sections directly in the region of the mouth.

The shell conventionally has a cylindrical shape, wherein a circular cylindrical shape is, however, not mandatory. In particular, the shell may also be formed from planar portions of sheet metal in the manner of a polygon in order to facilitate manufacture. In the case of a polygonal shape or a similar structure other than a circle, the direction from the reactor center axis to the shell is also generally denoted the radial direction.

A first variant of the invention provides that the reactor module is constructed as a module which receives inflow on the shell side such that the height, determined parallel to the reactor longitudinal axis, of the gas distribution chamber and of the gas collection chamber reduces, preferably continuously, towards the reactor center axis starting from the shell. The gas collection chamber and the gas distribution chamber are then configured substantially symmetrically to one another with regard to the catalyst bed arranged therebetween.

In the case of shell-side inflow, it must be borne in mind that, starting from the gas feed, the process gas does not flow solely towards the reactor center axis but also has to be distributed in the circumferential direction. In order to achieve a uniform distribution of the process gas in the gas distribution chamber, a gas guide means which extends parallel to the reactor center axis may also be arranged at a suitable distance in front of the shell-side mouth. In particular, simple baffles which deflect at least some of the gas stream in the circumferential direction may be provided in front of the shell-side mouth of the gas feed. Corresponding gas guide means may, for example, be arranged in a region which amounts to 0.7 to 0.9 times the radius between the reactor center axis and the shell.

In the case of a module which receives inflow on the shell side, the reactor walls arranged on both sides of the catalyst bed expediently have a concave shape, in particular a conical shape, starting from the reactor center axis, in relation to the catalyst bed. The reactor walls may be formed by a partition, a bottom or a top of the reactor. A conical shape is preferred for partitions, wherein the partitions may also be assembled from individual planar segments of sheet metal.

The bottom and top may likewise be of conical construction, wherein a rounded shape is frequently provided for reasons of stability. The described change in height of the gas distribution chamber or gas collection chamber can also be achieved in the case of such a rounded shape.

One variant of the invention provides that the reactor module is constructed as a module which receives central inflow such that a pipe length which extends, optionally with bends, towards the center of the reactor and respectively opens into the gas distribution chamber and the gas collection chamber in the region of the reactor center axis in each case adjoins the shell-side gas feed and the shell-side gas discharge, wherein the height, determined along the reactor longitudinal axis, of the gas distribution chamber and of the gas collection chamber reduces, preferably continuously, towards the shell starting from the reactor center axis. A particularly uniform distribution is obtained with such a module which receives central inflow. The greatest volumetric flow rates are obtained directly at the mouths of the pipe length, these flow rates then reducing outwards on the one hand due to the expanding geometry and on the other hand due to flow of the process gas through the catalyst bed.

The reactor walls arranged on both sides of the catalyst bed may, as previously described, have a conical shape, wherein a convex shape, in particular a conical shape, starting from the reactor center axis, in relation to the catalyst bed, is obtained for the module which receives central inflow.

In order to achieve maximally compact construction, the pipe lengths are preferably arranged within the catalyst bed. The catalyst bed is thus interrupted for arrangement of the pipe lengths.

For the purposes of the invention, there are various possible embodiments with regard to the specific development of the pipe lengths. One particularly simple design is achieved by the pipe lengths being formed by portions of a through-pipe which is interrupted by a partition plate. Thanks to an appropriate oblique position of the partition plate, the two mouths in the gas distribution chamber and the gas collection chamber can be commonly arranged precisely concentrically about the reactor center axis.

As has already previously been explained, the catalytic reactor, in particular in a development as a contact tower for converting $SO_2$ into $SO_3$ in the production of sulfuric acid, comprises a plurality of reactor modules arranged one above the other. For the purposes of the invention, this gives rise to the particular advantage that the modules which receive central inflow on the one hand and the modules which receive radial inflow on the other hand require a precisely opposing oblique position of the partition plates, such that the described module which receives inflow on the shell side may then, via a common partition plate, directly adjoin the previously described module which receives central inflow.

In particular, for the purposes of the invention, an alternating succession of a plurality of modules which receive inflow on the shell side and a plurality of modules which receive central inflow can be particularly simply arranged in a sequence ABAB, wherein improved flow conditions can be achieved for both types of modules by modifying the height in the radial direction.

In such an alternating arrangement of mutually complementary modules, an upwardly curved partition is followed, along the conventionally vertically oriented reactor longitudinal axis, by a reactor bed, a downwardly curved partition and a further reactor bed, wherein the two reactor beds receive inflow differently in the described manner.

Finally, it is also possible for the purposes of the invention to combine a shell-side inflow with a central discharge or a central inflow with a shell-side discharge. Corresponding modules may, for example, be provided at the bottom or top of the reactor vessel.

The catalytic reactor according to the invention is distinguished by a particularly simple design because a particularly uniform flow distribution in the individual modules can also be achieved without a central pipe which extends along the reactor longitudinal axis, thus conventionally the vertical axis. The individual components of the catalytic reactor which are accommodated in the shell have a substantially cone or disk shape and can thus particularly straightforwardly be arranged one above the other. During assembly, the catalytic reactor can thus straightforwardly be constructed in succession from the bottom upwards.

The individual inserts also have a comparatively simple shape. The partitions arranged between the modules may, for example, be simply assembled from pieces of sheet metal. It is here also possible to assemble the individual partitions from a plurality of pieces of sheet metal without welding, to which end these pieces of sheet metal can be joined for example by a tongue and groove joint, bolts or the like.

The described structure with individual disk- or cone-shaped elements within the shell also allows a simple supporting structure to be integrated by supports which extend parallel to the reactor longitudinal axis, thus conventionally vertically. It is here possible to provide supports which extend through the entire height of the catalytic reactor and are guided through associated openings in the catalyst beds and partitions. Individual pieces which extend over only part of the height may, however, particularly simply be provided. In order to accommodate such supports, the partitions may be provided for example with journals, openings or the like, whereby particularly simple assembly and disassembly is possible.

Irrespective of the specific embodiment of the reactor modules, the catalytic reactor according to the invention comprises shell-side gas feeds and gas discharges, such that very good accessibility is obtained. Corresponding gas feeds and discharges can be arranged distributed in virtually any desired geometry around the entire circumference.

Figure 1:
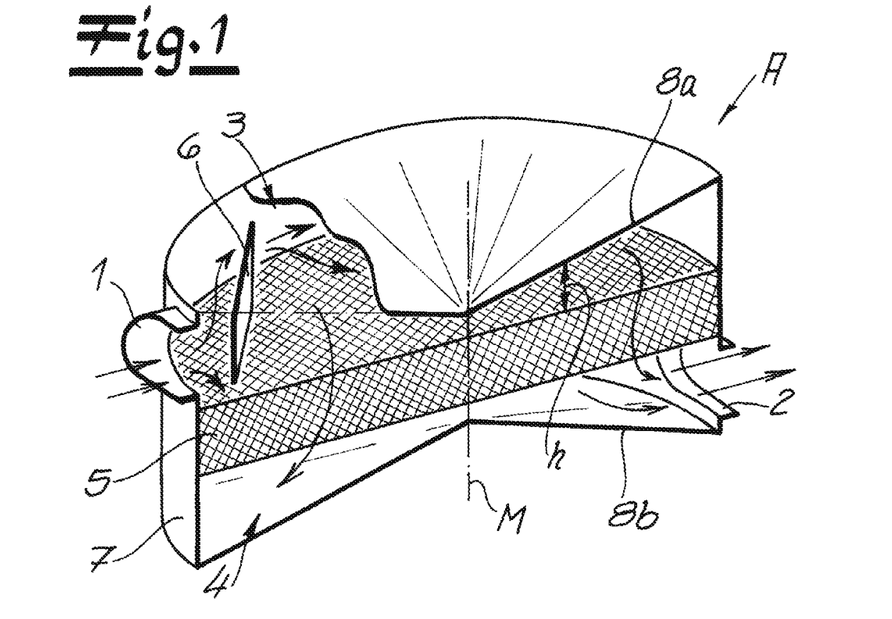
FIG. 1 is a partial cutaway view of an example reactor module of a catalytic reactor.

FIG. 1 shows an example of a catalytic reactor module A which receives inflow on the shell side.

The module A which receives inflow on the shell side is connected to a shell-side gas feed 1 and a shell-side gas discharge 2. In the module A which receives inflow on the shell side according to FIG. 1, the gas feed 1 opens directly into a gas distribution chamber 3, while the gas discharge 2 is connected on the shell side to a gas collection chamber 4. A catalyst bed 5, through which flow proceeds vertically, is located between the gas distribution chamber 3 and the gas collection chamber 4. Arrows in the figures indicate through-flow of the process gas.

In order to distribute the process gas flowing in through the gas feed 1 initially uniformly around the circumference of the gas distribution chamber 3, a gas guide means 6, which is formed of two baffles arranged obliquely to one another, is arranged at a suitable distance in front of the mouth of the gas feed 1. Starting from an approximately uniform distribution of the process gas around the circumference of the gas distribution chamber 3, it must be borne in mind that the volumetric flow rate decreases towards a reactor center axis M due to some of the process gas entering the catalyst bed 5. In order to achieve optimum flow characteristics, a height h, determined parallel to the reactor center axis M, between the catalyst bed 5 and an associated reactor wall 8a reduces starting from the shell-side mouth of the gas feed 1 on the shell 7 of the catalytic reactor, such that, in the sectional representation according to FIG. 1, the flow cross-section reduces towards the reactor center axis M.

To this end, the upper reactor wall 8a shown in FIG. 1 has a conical shape with a downwardly pointing vertex. The reactor wall 8a can be straightforwardly assembled from a plurality of, optionally also planar, pieces of sheet metal.

The gas collection chamber 4 having the shell-side connection of the gas discharge 2 has a complementary shape. The lower reactor wall 8b in FIG. 1 likewise has a conical shape, but with an upwardly pointing vertex.

Thanks to the described arrangement of the reactor walls 8a, 8b, it is possible to achieve a particularly uniform flow distribution and thus also a particularly efficient catalytic conversion. The catalytic reactor shown in the figures in particular takes the form of a multistage contact tower for converting sulfur dioxide into sulfur trioxide in the production of sulfuric acid.

Figure 2:
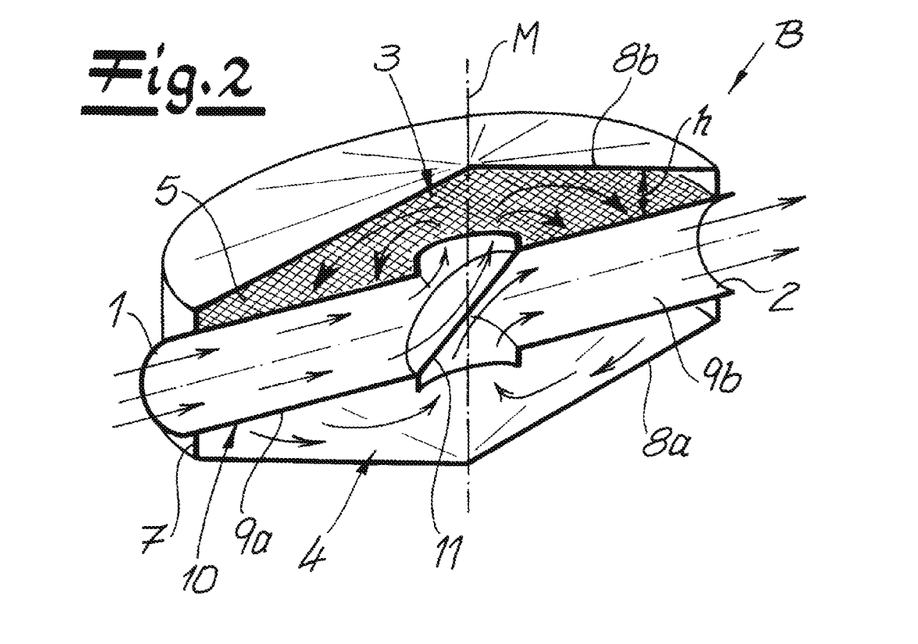
FIG. 2 is a partial cutaway view of another example reactor module of a catalytic reactor.

FIG. 2 shows a module B which receives central inflow. A shell-side gas feed 1 and a shell-side gas discharge 2 are also provided according to FIG. 2, wherein however the gas feed 1 and the gas discharge 2 are in each case firstly connected to a pipe length 9a, 9b which extends in the catalyst bed 5. The upper reactor wall 8b in FIG. 2 has a conical shape with an upwardly pointing vertex and the lower reactor wall 8a has a conical shape with a downwardly pointing vertex. The flow cross-sections are correspondingly also adapted thereto according to FIG. 2 in that, starting from the mouths of the pipe lengths 9a, 9b, flow decreases in the radial direction by the process gas not only being distributed in the radial direction but also flowing through the catalyst bed 5 in the vertical direction.

FIG. 2 shows a particularly simple development of the pipe lengths 9a, 9b which are formed by portions of a through-pipe 10, wherein the through-pipe 10 is divided by an obliquely arranged partition plate 11 into pipe lengths 9a and 9b. Thanks to the oblique arrangement of the partition plate 11, the mutually opposing mouths of the pipe lengths 9a, 9b can be arranged coaxially on the reactor center axis M.

It is already apparent from FIGS. 1 and 2 that the module A which receives inflow on the shell side according to FIG. 1 and the module B which receives central inflow of FIG. 2 may then adjoin one another via a common reactor wall 8b.

Figure 3:
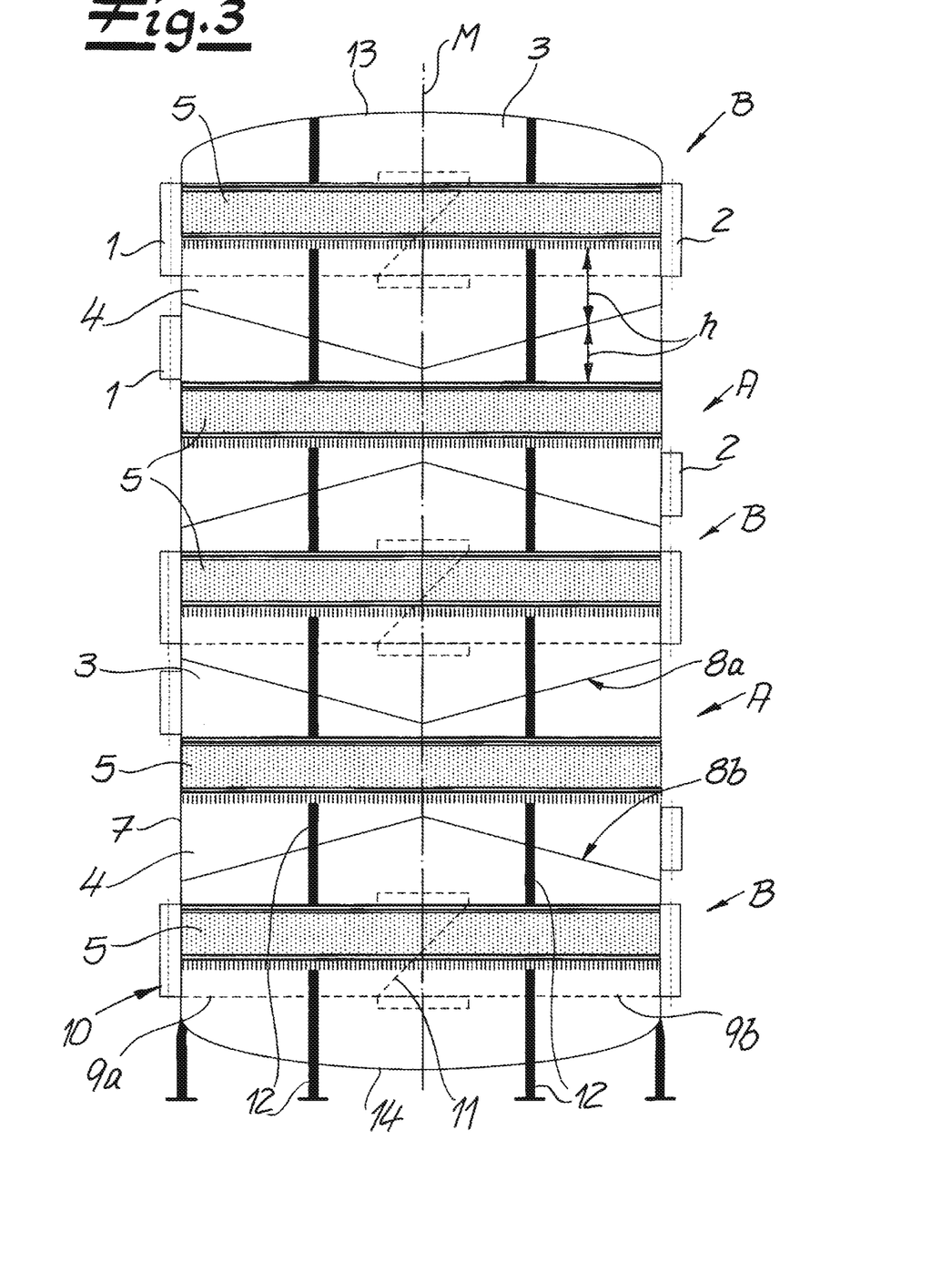
FIG. 3 is a schematic sectional view of an example catalytic reactor having a plurality of reactor modules that succeed one another in a vertical direction.

On that basis, FIG. 3 shows a catalytic reactor, namely a multistage contact tower for converting sulfur dioxide into sulfur trioxide in the production of sulfuric acid in which modules B which receive central inflow modules and modules A which receive inflow on the shell side are arranged in immediate succession in a sequence B/A/B/A/B, wherein the successive modules A, B are in each case separated by common reactor walls 8a, 8b.

According to FIG. 3, the gas feeds 1 and the gas discharges 2 are shown in a section plane. It will, however, be understood that the gas feeds 1 and the gas discharges 2 are conventionally distributed around the entire circumference of the shell 7 in a suitable configuration in accordance with the applicable requirements.

It may be inferred from a comparison of FIG. 3 with FIGS. 1 and 2 that the pipe 10 in the module B which receives central inflow has a circular cross-section, while the gas feed 1 and the gas discharge 2 in a module A which receives inflow on the shell side may also have a shape extended in the horizontal direction to increase the flow cross-section.

It is apparent from FIG. 3 that the entire multistage contact tower can be constructed particularly easily because the catalyst bed 5 and the reactor walls 8a, 8b are disk- or cone-shaped and can thus be stacked one on top of the other in the shell 7. Supports 12 may be provided to support the individual elements, wherein these supports 12 preferably do not extend over the entire height of the catalytic reactor but instead merely connect the successive elements to one another.

In FIG. 3, the two modules A which receive inflow on the shell side and the three modules B which receive central inflow are of substantially matching construction. The modules B which receive central inflow merely differ in that the uppermost and lowermost modules are in each case bounded not by an internal partition, but instead respectively by a top 13 and a bottom 14 of the reactor.

Figure 4:
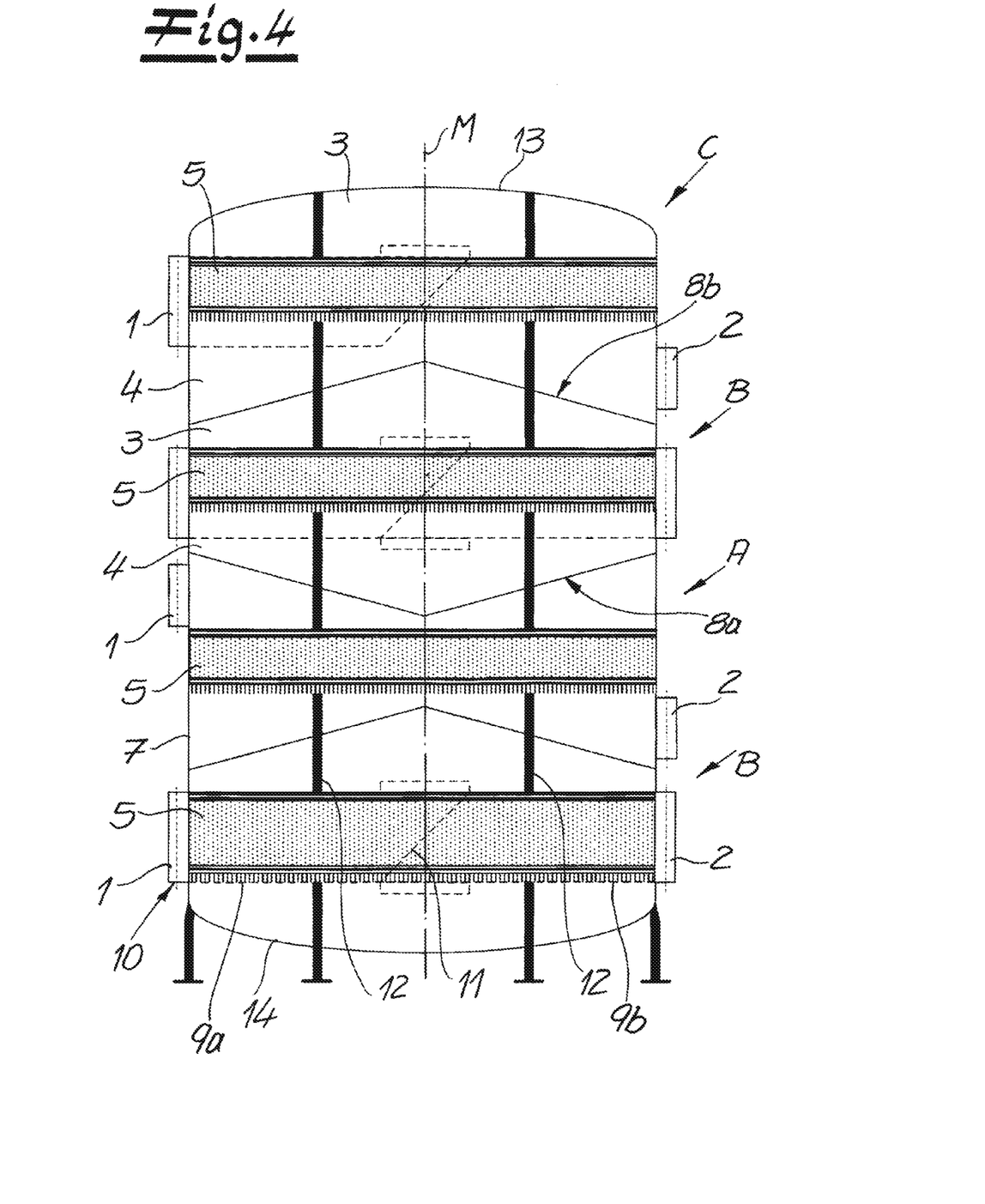
FIG. 4 is a schematic sectional view of yet another example catalytic reactor having a plurality of reactor modules that succeed one another in a vertical direction.
Figure 5:
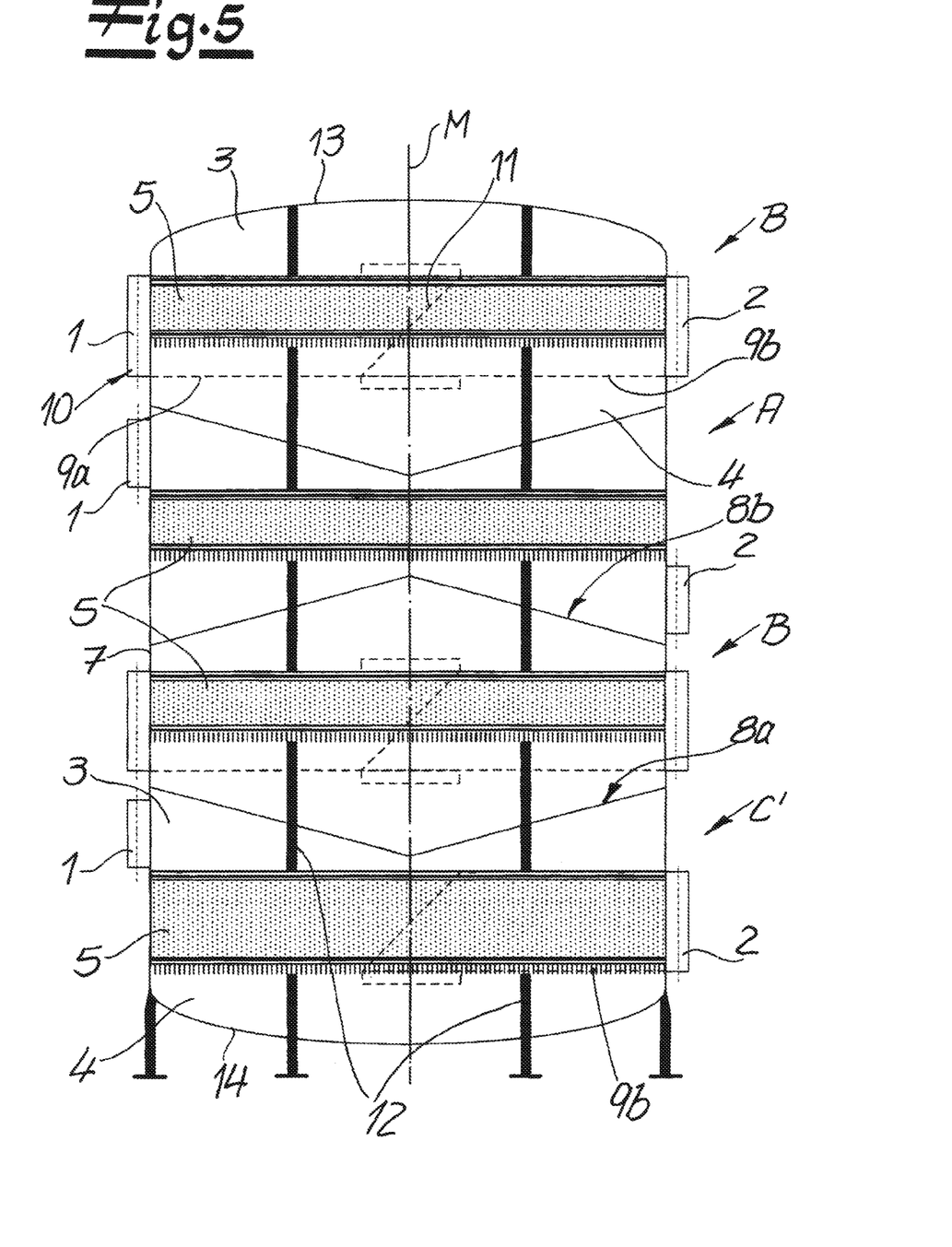
FIG. 5 is a schematic sectional view of still another example catalytic reactor having a plurality of reactor modules that succeed one another in a vertical direction.

FIGS. 4 and 5 show an alternative development of the catalytic reactor with a total of just four modules, wherein in each case three modules are constructed exactly as explained in the development according to FIG. 3.

On that basis, the uppermost module C of FIG. 4 shows another development comprised by the invention, in which inflow proceeds centrally, but the process gas is discharged on the shell side. Said module C thus combines the previously described features of the module A which receives inflow on the shell side and of the module B which receives central inflow, wherein, in contrast with the shell-side modules A and the modules B which receive central inflow, the two partitions of the corresponding module C are bent or curved in the same direction. The module C question is thus bounded on the one hand by the upwardly curved top 13 and on the other hand by a conical reactor wall 8b with an upwardly pointing vertex.

FIG. 5 shows a development in which, as an alternative to FIG. 4, the lowermost module C' receives radial inflow, while the process gas is centrally discharged via a corresponding pipe length 9b. Said module C' is bounded by the downwardly curved bottom 14 and a conical reactor wall 8a with a downwardly pointing vertex.

Figure 6:
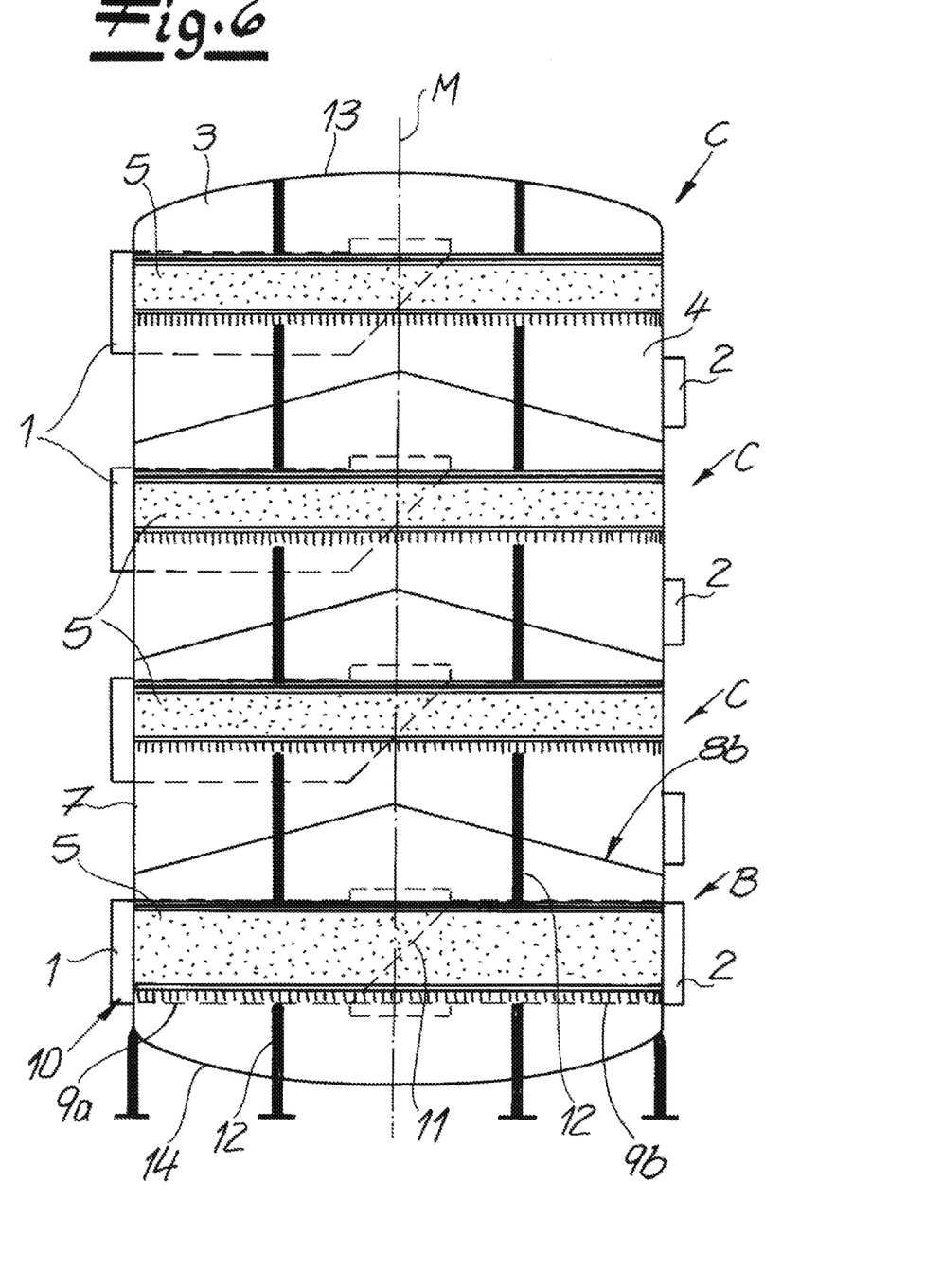
FIG. 6 is a schematic sectional view of another example catalytic reactor having a plurality of reactor modules that succeed one another in a vertical direction.

Finally, FIG. 6 shows that correspondingly combined modules C, B may be provided not only at the upper and the lower ends of the catalytic reactor.

What is claimed is:

1. A catalytic reactor comprising:
a shell that extends about a reactor center axis; and
at least one reactor module that includes
a gas distribution chamber connected to a shell-side gas feed, wherein the shell-side gas feed either
opens into the gas distribution chamber on a shell side, wherein a height of the gas distribution chamber, which is parallel to the reactor center axis, reduces towards the reactor center axis starting from a mouth of the shell-side gas feed, or
is connected to a pipe length that extends towards the reactor center axis and opens into the gas distribution chamber in a region of the reactor center axis, wherein the height of the gas distribution chamber reduces towards the shell starting from the pipe length that extends towards the reactor center axis and opens into the gas distribution chamber in the region of the reactor center axis,
a gas collection chamber connected to a shell-side gas discharge, wherein the shell-side gas discharge either
opens into the gas collection chamber on a shell side, wherein a height of the gas collection chamber, which is parallel to the reactor center axis, reduces towards the reactor center axis starting from a mouth of the shell-side gas discharge, or
is connected to a pipe length that extends towards the reactor center axis and open into the gas collection chamber in the region of the reactor center axis, wherein the height of the gas collection chamber reduces towards the shell starting from the pipe length that extends towards the reactor center axis and opens into the gas collection chamber in the region of the reactor center axis, and
a catalyst bed that is disposed between the gas distribution chamber and the gas collection chamber and extends transversely to the reactor center axis, wherein the gas distribution chamber and the gas collection chamber are each bounded by the catalyst bed and an associated reactor wall,
wherein
the shell-side gas feed opens into the gas distribution chamber on the shell side, wherein the at least one reactor module is configured such that the heights of the gas distribution chamber and of the gas collection chamber, as determined parallel to the reactor center axis, reduce towards the reactor center axis starting from the shell
or wherein
the reactor walls are disposed on both sides of the catalyst bed and have a concave shape, starting from the reactor center axis, relative to the catalyst bed, wherein the shell-side gas feed is connected to the pipe length that extends towards the reactor center axis and opens into the gas distribution chamber in the region of the reactor center axis and the shell-side gas discharge is connected to the pipe length that extends towards the reactor center axis and open into the gas collection chamber in the region of the reactor center axis, and wherein the heights of the gas distribution chamber and of the gas collection chamber, as determined parallel to the reactor center axis, reduce towards the shell starting from the reactor center axis wherein the reactor walls are disposed on both sides of the catalyst bed and have a convex shape, starting from the reactor center axis, relative to the catalyst bed and wherein the pipe lengths are disposed within the catalyst bed.

2. The catalytic reactor of claim 1 comprising a gas guide means that extends parallel to the reactor center axis and is disposed in the gas distribution chamber in front of the mouth of the shell-side gas feed.

3. The catalytic reactor of claim 1 wherein the pipe lengths are comprised of portions of a through-pipe that is interrupted by a partition plate.

4. The catalytic reactor of claim 1 wherein the reactor comprises a first reactor module and a second reactor module that adjoins the first reactor module, wherein the shell-side gas feed of the first reactor module opens into the gas distribution chamber on the shell side, wherein the shell-side gas discharge of the second reactor module is connected to the pipe length that extends towards the reactor center axis and open into the gas collection chamber in the region of the reactor center axis.

5. The catalytic reactor of claim 4 wherein the reactor comprises a third reactor module and a fourth reactor module, wherein the shell-side gas feed of the third reactor module opens into the gas distribution chamber on the shell side, wherein the shell-side gas discharge of the fourth reactor module is connected to the pipe length that extends towards the reactor center axis and open into the gas collection chamber in the region of the reactor center axis, wherein the first and third reactor modules are disposed in alternating succession with the second and fourth reactor modules.

6. The catalytic reactor of claim 1 wherein the reactor comprises a first reactor module and a second reactor module, wherein the shell-side gas feed of the first and second reactor modules are connected to the pipe lengths that extend towards the reactor center axis and open into the gas distribution chamber in the region of the reactor center axis.

* * * * *